United States Statutory Invention Registration [19]

[11] Reg. Number: H120

Corwin [45] Published: Sep. 2, 1986

[54] METHOD OF ELECTROFORMING A CERAMIC FACED WORKPIECE

[75] Inventor: John M. Corwin, Royal Oak, Mich.

[73] Assignee: Chrysler Corporation, Highland Park, Mich.

[21] Appl. No.: 716,306

[22] Filed: Mar. 27, 1985

Related U.S. Application Data

[62] Division of Ser. No. 520,782, Aug. 5, 1983, abandoned.

[51] Int. Cl.[4] ..... B23P 17/00

[52] U.S. Cl. ..... 29/421 M; 123/90.51

[58] Field of Search ..... 123/90.51, 90.48, 90.49; 29/421 M, 156.7 B

[56] References Cited

U.S. PATENT DOCUMENTS

| | | | |
|---|---|---|---|
| 1,551,948 | 9/1925 | Germonperez | 123/90.51 |
| 2,987,815 | 6/1961 | Zeller | 123/90.51 |
| 4,261,092 | 4/1981 | Corwin | 29/421 M |
| 4,366,785 | 1/1983 | Goloff | 123/90.51 |

*Primary Examiner*—Harold J. Tudor

*Attorney, Agent, or Firm*—Mark P. Calcaterra

[57] ABSTRACT

An improved method of electromagnetic forming a ceramic member to the end of a metallic member by the utilization of a metal sleeve which fits over the ceramic-metal joint formed by the two pieces to be joined. The metal sleeve traps the ceramic and the metal pieces together in one electromagnetic forming operation.

6 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF ELECTROFORMING A CERAMIC FACED WORKPIECE

This is a division of application Ser. No. 06/520,782 filed on Aug. 5, 1983, now abandoned.

BACKGROUND AND SUMMARY OF THE INVENTION

Monolithic ceramic, high carbide content powdered metal, cast metal wear resistant alloy and other metallic and non-metallic materials have been considered as wear surfaces for engine valve train tappets, rocker arms and finger followers. In each of these cases the method proposed to attach the wear resistant material to valve train parts has introduced additional piece costs and manufacturing complexity.

The subject of this invention is a workpiece modified to permit attachment of the wear face through the use of a sleeve electromagnetically formed around the workpiece body and wear face so as to firmly attach the two pieces together. This method offers manufacturing process and piece cost advantages over the more conventional braze, solder or adhesive bonding or shrink fitting techniques.

Examples of the prior art can be found in United Kingdom Patent Application No. 2,093,554A and in U.S. Pat. No. 4,366,785.

The basics of the method employed can be found in U.S. Pat. No. 4,261,092.

Factors and features thought to be critical in the electromagnetic forming method when applied to a typical hydraulic tappet body include the physical and mechanical properties of the sleeve, sleeve thickness, diametric differences between the sleeve, tappet wear pad and tappet body, the thickness of the wear pad and the clamping angles on the tappet body and wear pad outside diameter in the sleeve contact zone. This latter feature controls the clamping force normal to the plane of the wear pad face. Electromagnetic forming of the sleeve when ceramic or other brittle material wear pads are employed incorporates the principals described in U.S. Pat. No. 4,261,092 entitled "Method of Electroforming a Metallic Sleeve and Ceramic Shaft Joint".

DETAILED DESCRIPTION OF THE PREFERRED EMBODIMENT

Figure 1:
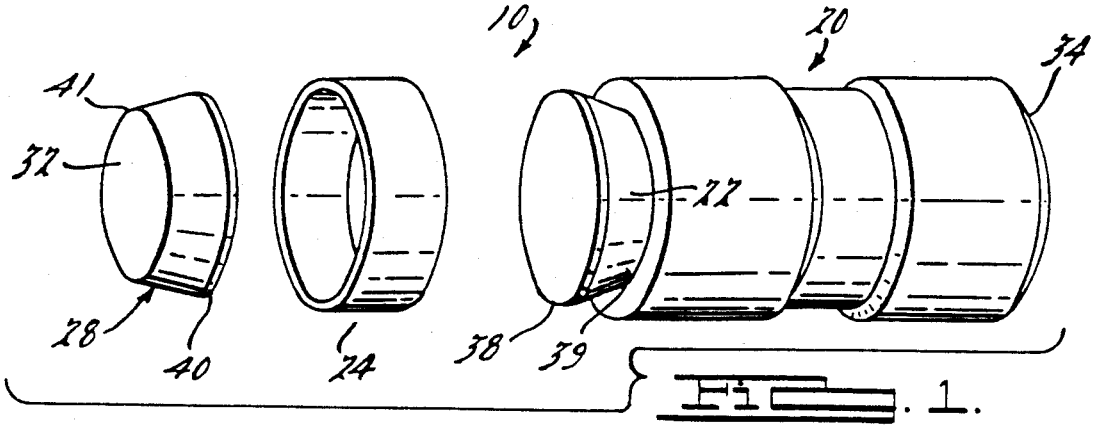
FIG. 1 is an exploded view of the workpiece body sleeve and ceramic scuff disc.

Referring to FIG. 1, the invented process is described with respect to the mating of a ceramic scuff disc 28 to a metallic engine tappet 20 with the application of a cylindrical metal sleeve 24 about the mated ceramic disc and metallic tappet assembly 10. Not shown in this application but more fully described in U.S. Pat. No. 4,261,092 are shock wave absorbing pads which are employed at the ends of the assembly 10, if necessary, to prevent cracking of the ceramic during electromagnetic deformation of the sleeve 24. The purpose of the pads is to absorb shock waves which are propagated in the longitudinal direction in the assembly. The need for the pads is a function of the fracture toughness, elastic modulus, strength and internal friction properties of the ceramic. The pads, if needed, would sit on one or both ends of engine tappet assembly 10 either on ceramic face 32 or engine tappet end 34 or both. Another possible location for a pad is at the bottom 43 of the tappet body bore 42. Also not shown but a necessary part of the method described is some form of solid-bed supporting structure and powered ram. One end of the assembly 10 will be supported by the solid support bed and the other will be in contact with the powered ram. The ram can be placed into position to apply a desired compressive longitudinal load to the assembly 10 without interfering with the operation of the remainder of the electromagnetic deformation process. This is also disclosed in U.S. Pat. No. 4,261,092.

The first step in the subject method involves the forming of a work surface at the end of the metal workpiece or tappet. The preferred shape of the working surface on the end of the tappet is a frustum 22 having two end planes, one small 39 and one large 38. The small end plane 39 being located at the end of the metal workpiece 20 and the large end plane 38 being available for mating with the ceramic scuff disc 28.

The ceramic scuff disc 28 is also formed in the shape of a frustum having two end planes, one small 41 and one large 40. Although the frustum shape is believed to be the most ideal to enhance the mating of the disc 28 and metal frustum 22, other shapes are also possible. The advantage accrues in that when the metal sleeve 24 is electromagnetically formed around both frustum pieces 22 and 28, the sleeve is deformed around the shape of the frustum and forms a clamping angle force on both frustums thereby urging the mating of the frustums.

The next step of the method includes forming of mating surfaces on the large end planes of the metal workpiece frustum 22 and on the ceramic scuff disc frustum 28. The two mating surfaces are then placed next to each other and a metal sleeve 24 is placed over the peripheral edge which is formed by the juxtaposed mating surfaces of the frustums.

The assembly 10 is then inserted between the powered ram and the solid support structure, using shock absorbing pads on one or both ends of the assembly 10 if necessary. A predetermined axial load is then applied to the assembly 10 in an amount greater than the axial loads caused by the sudden compression of the ceramic material during the electromagnetic deformation.

The last step involves the electromagnetic deformation of the metallic sleeve in such a way that the sleeve conforms to the shapes of the frustums on the ceramic disc and the metal workpiece thereby trapping the ceramic disc to the end of the metal tappet frustum. The metal sleeve 24 can be formed from suitable metallic materials which are electrically conductive.

As described in U.S. Pat. No. 4,261,092, the electromagnetic deformation equipment includes a torodial conductive coil which surrounds the metal sleeve 24 in close proximity thereto. The metallic coil has electrical leads extending therefrom which will be connected to a source of electrical energy such as a capacitor bank. Upon transferring a large quantity of electrical energy from the bank to the electrical coil over a short period, a magnetic field is created, which interacts electromagnetically with the metal sleeve and thereby produces a magnetic pressure on the metal sleeve sufficient to swage or form the sleeve member tightly against the periphery of both the ceramic scuff disc 28 and metallic tappet frustum 22.

Figure 2:
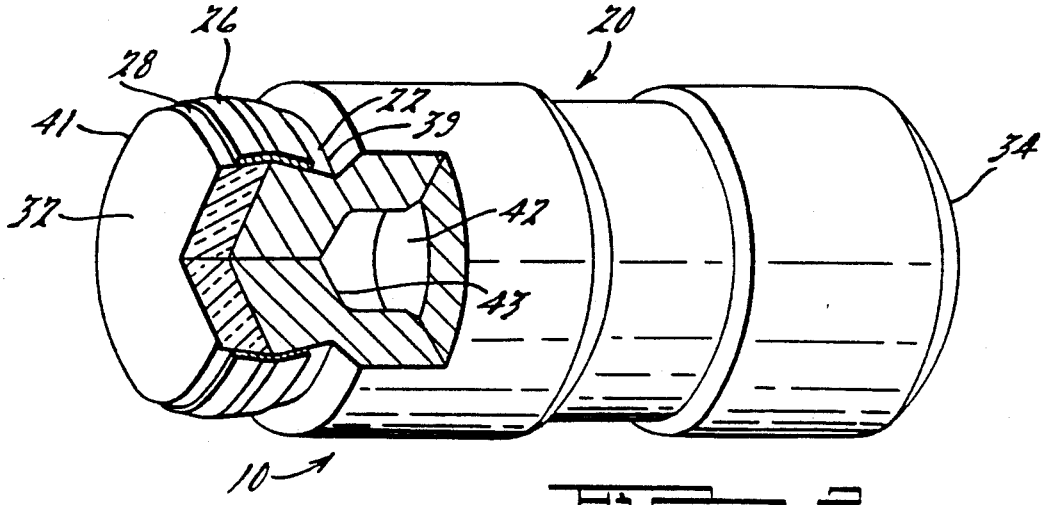
FIG. 2 is a partial cut-away view of the assembly of the workpiece body, ceramic scuff disc and sleeve after electromagnetic deformation.
Figure 3:
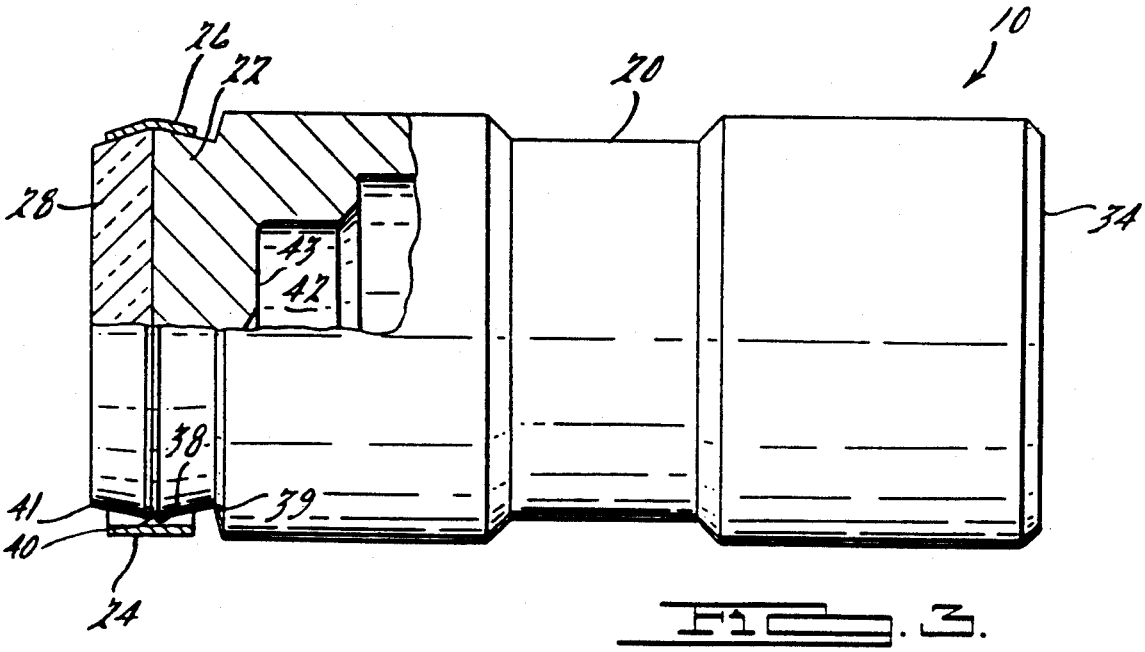
FIG. 3 is another partial cut-away view of the assembly of the ceramic scuff disc and the workpiece body. Also shown in partial cut-away is the sleeve before and after electromagnetic deformation.

FIGS. 2 and 3 illustrate the tappet assembly in completed form. FIG. 3 also shows metal sleeve in a preforming 24 and a post-forming 26 condition.

What is claimed is:

1. A method of joining a ceramic scuff disc to an end of a metal workpiece comprising the steps of:

forming a frustum at the end of the metal workpiece; the frustum having two end planes, one small and one large; the small end plane of the frustum being located at the end of the metal workpiece and the large end plane of the frustum being available for mating with the ceramic scuff disc;

forming a frustum at one end of the ceramic scuff disc; the frustum having two end planes, one small and one large;

forming mating surfaces on the large end planes of the metal workpiece frustum and of the ceramic scuff disc frustum;

mating the ceramic scuff disc with the metal workpiece by joining the respective mating surfaces;

placing a metal sleeve over the peripheral edge formed by the juxtaposed mating surfaces;

applying a predetermined compressive longitudinal load to the assembly formed by the ceramic scuff disc and the metal workpiece;

electromagnetically deforming the metallic sleeve such that the sleeve conforms to the shapes of the frustums on the ceramic disc and the metal workpiece thereby trapping the ceramic disc to the end of the metal workpiece.

2. The method of claim 1 further comprising:

the placing of a first shock absorbing pad on the small end plane of the ceramic disc frustum prior to application of a compressive longitudinal load; the pad being adapted to absorb shock waves propagated in the longitudinal direction in the assembly now made up of the first shock absorbing pad, the ceramic scuff disc and the metal workpiece; the need of the pad being a function of the elastic modulus, strength, fracture toughness and internal friction properties of the ceramic.

3. The method of claim 2 further comprising:

the placing of a second shock absorbing pad means on at least one of the surfaces of the metal workpiece longitudinally opposite to the metal workpiece frustum prior to application of a compressive longitudinal load; the pad being adapted to absorb shock waves propagated in the longitudinal direction in the assembly now made up of the first shock absorbing pad, the ceramic disc, the metal work-piece and the second shock absorbing pad means; the need of the pad and pad means being a function of the elastic modulus, strength, fracture toughness and internal friction properties of the ceramic.

4. The method of claim 1 wherein said predetermined compressive longitudinal load is greater than the tensile longitudinal loads caused by the sudden radial compression of the ceramic material during the electromagnetic deformation.

5. The method of claim 2 wherein said predetermined compressive longitudinal load is greater than the tensile longitudinal loads caused by the sudden radial compression of the ceramic material during the electromagnetic deformation.

6. The method of claim 3 wherein said predetermined compressive longitudinal load is greater than the tensile longitudinal loads caused by the sudden radial compression of the ceramic material during the electromagnetic deformation.

* * * * *